United States Patent [19]

Anderson

[11] 4,073,245
[45] Feb. 14, 1978

[54] LEVEE FORMING APPARATUS AND METHOD

[76] Inventor: Everett Anderson, Box 812, Eagle Lake, Tex. 77434

[21] Appl. No.: 686,163

[22] Filed: May 13, 1976

[51] Int. Cl.² ............................ A01C 5/06; A01C 7/08; A01B 49/04
[52] U.S. Cl. ............................................ 111/1; 37/99; 61/30; 111/10; 111/DIG. 1; 172/72; 172/119; 172/701
[58] Field of Search ................... 172/701, 176, 35, 46, 172/50, 57, 60, 63, 64, 65, 71, 72, 79, 119, 175, 200, 70, 686, 642, 532; 111/1, 8–13; 37/99, 43 E; 61/30, 63

[56] References Cited

U.S. PATENT DOCUMENTS

| 1,391,765 | 9/1921 | Donaldson | 37/99 |
| 2,342,030 | 2/1944 | Bagan | 172/119 |
| 2,644,252 | 7/1953 | Brown | 172/701 X |
| 2,748,507 | 6/1956 | Appleton | 37/99 |
| 3,059,355 | 10/1962 | Patterson et al. | 172/119 X |
| 3,086,304 | 4/1963 | Tendresse | 37/43 E |
| 3,087,557 | 4/1963 | Hohstadt | 172/47 X |
| 3,347,188 | 10/1967 | Richey | 111/10 |
| 3,454,104 | 7/1969 | Fuchs | 172/176 |
| 3,503,450 | 3/1970 | Day | 37/142.5 UX |
| 3,876,013 | 4/1975 | Dunn | 172/71 |

FOREIGN PATENT DOCUMENTS

| 187,331 | 12/1955 | Austria | 172/146 |
| 1,052,148 | 3/1959 | Germany | 111/8 |
| 387,406 | 11/1923 | Germany | 172/64 |
| 984,351 | 2/1965 | United Kingdom | 172/119 |
| 175,324 | 11/1965 | U.S.S.R. | 172/701 |
| 314,474 | 9/1971 | U.S.S.R. | 172/701 X |

Primary Examiner—Edgar S. Burr
Assistant Examiner—Steven A. Bratlie
Attorney, Agent, or Firm—Pravel, Wilson & Gambrell

[57] ABSTRACT

A towed levee forming apparatus and method of using for forming a dike or levee which is particularly suited for use with agriculture operations. The apparatus includes a plurality of laterally spaced digger means for forming corresponding ditches in the ground surface and having a helical auger means transporting the earth removed from the ditches to a predetermined location on the apparatus. The removed earth is then deposited at the predetermined location on the earth surface and worked to form a levee of desired cross-section. The levee formation is preferably accomplished in a single pass of the apparatus.

18 Claims, 8 Drawing Figures

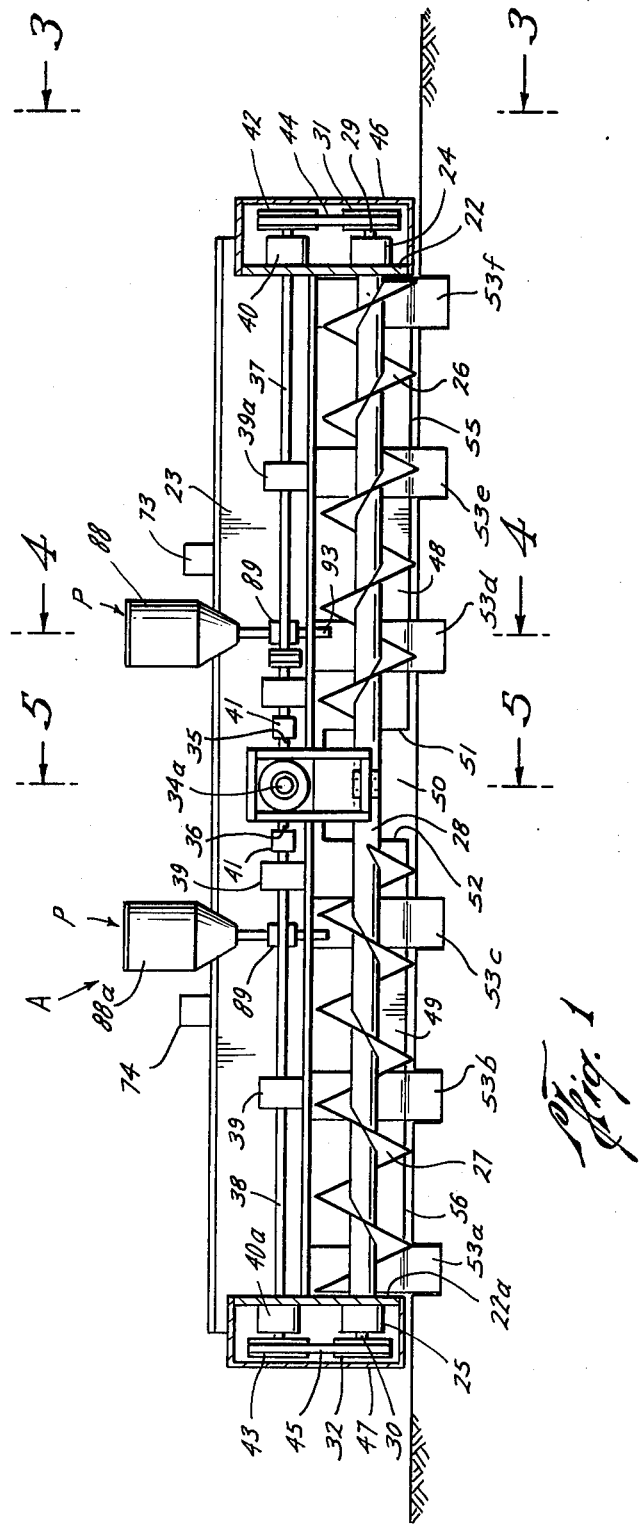

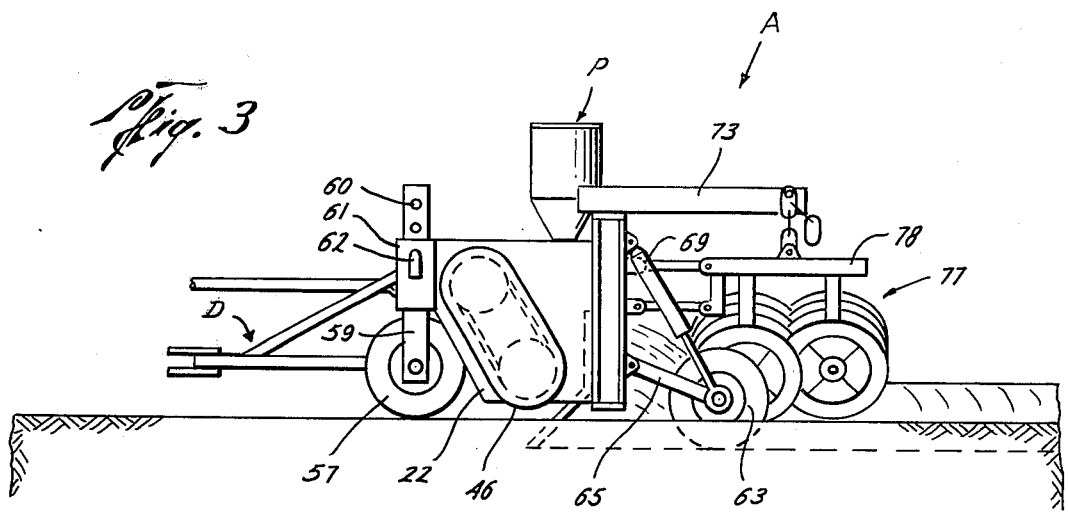
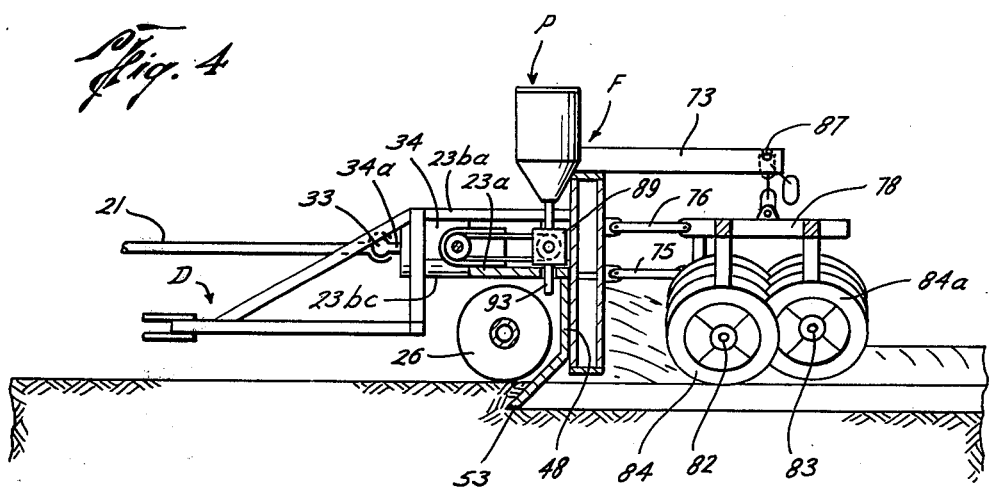
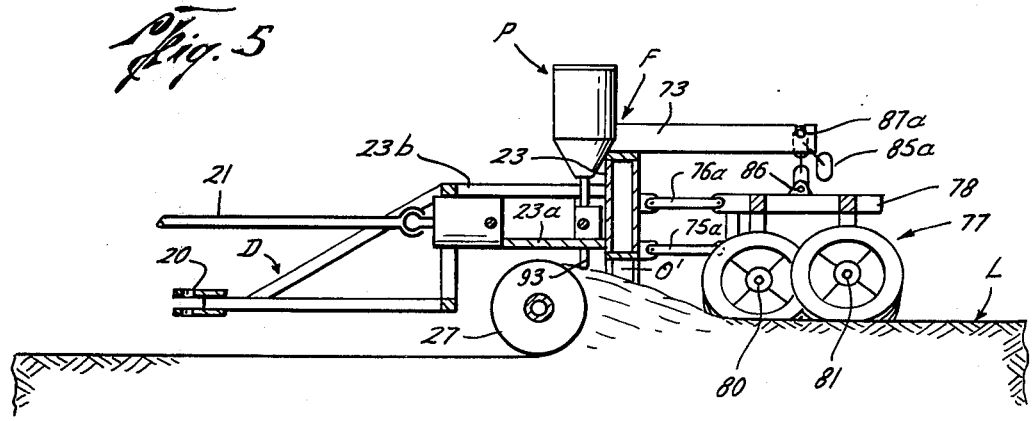

LEVEE FORMING APPARATUS AND METHOD

BACKGROUND OF THE INVENTION

This invention relates to the field of forming levees or dikes in connection with growing rice and other crops and other water holding purposes requiring a levee.

The use of levees in a rice field is well-known in the prior art. Various apparatuses have been designed to form such levees so that rice farmers and others having similar irrigated crops will have fewer problems associated with flood irrigation of the entire fields. Reference is made to U.S. Pat. Nos. 3,568,453 and 3,760,885 as well as the prior art patents cited in these patents which disclose levee or dike forming apparatuses and certain problems encountered in levee forming. Additional known patents are as follows: U.S. Pat. Nos. 2,109,393; 2,837,989; 3,012,371; 3,012,615; 3,091,873; 3,121,973; 3,303,799; 3,316,865; and 3,658,135. As far as known, certain problems still exist with such apparatus. One such problem is building a levee of uniform dimension without dips and weak spots in varying soil and moisture conditions. Another problem is the need to maintain earthen levees throughout the tillage and fallow period of the land when the levees are not needed.

Rice or other like crop fields are generally flat and proper drainage of the field to support the heavy equipment used for crop harvesting and field preparation is necessary. During field preparation or tillage, wet spots formed in small depressions along levees may delay tillage work after each rainfall since the field may be too soft for the equipment and may require manual work to drain the soft spots. After planting, hand labor is usually required for levee repair of washouts and the like since the heavy equipment will destroy some of the growing crop. Prior to harvest the irrigating water is drained from the field to enable sufficient drying of the ground surface to support the heavy harvest equipment. If the irrigating water is held in the field from inadequate drainage, the ground surface may not be capable of supporting the harvesting equipment, and repairs of equipment may increase due to the increased demands on the equipment and the harvesting operation may be slowed down resulting in decrease of crop yield, often the field is rutted and made difficult to prepare for the next growing season. When crop rotation is practiced to overcome such problems as infestations of water weeds, it may be desirable to remove the levees to eliminate water retention.

SUMMARY OF THE INVENTION

This invention relates to a new and improved apparatus and method for forming levees in a field.

In the preferred embodiment, the levee forming apparatus includes a plurality of laterally spaced digger plows which form corresponding borrow ditches in the field. The earth removed from the borrow ditches is transported by a helical auger means to a predetermined location on the apparatus for depositing to form a levee or dike. The deposited soil is then worked by the apparatus to form a certain levee of substantially uniform dimension. The digger plows are depth controlled by gauge wheels to provide uniform depth control. A planter means may be provided to plant the levee to enhance crop yield since the levee may be formed after the field has been seeded. Apparatus mounted wheels are provided to shape and pack the deposited earth to form the levee.

An object of this invention is to provide new and improved method and apparatus which forms a uniform levee in a single pass.

Another object is to form a levee which has a good yield of crop across the levee.

Another object is to form a levee which can be readily removed after the growing season and which minimizes wet spots and over flooding.

Other objects will be apparent from the following description of the apparatus and method and will flow from the practice of this invention.

BRIEF DESCRIPTION OF THE DRAWINGS

FIG. 1 is a front elevation view, partly in section, of the new and unobvious apparatus performing the method of this invention;

FIG. 2 is a cross-section of the ground surface and levee as formed by the apparatus and method of this invention;

FIG. 3 is a side elevation view taken along line 3—3 of FIG. 1;

FIG. 4 is a side view taken along line 4—4 in FIG. 1;

FIG. 5 is a side view taken along line 5—5 in FIG. 1;

DESCRIPTION OF THE PREFERRED EMBODIMENT

Figure 6:
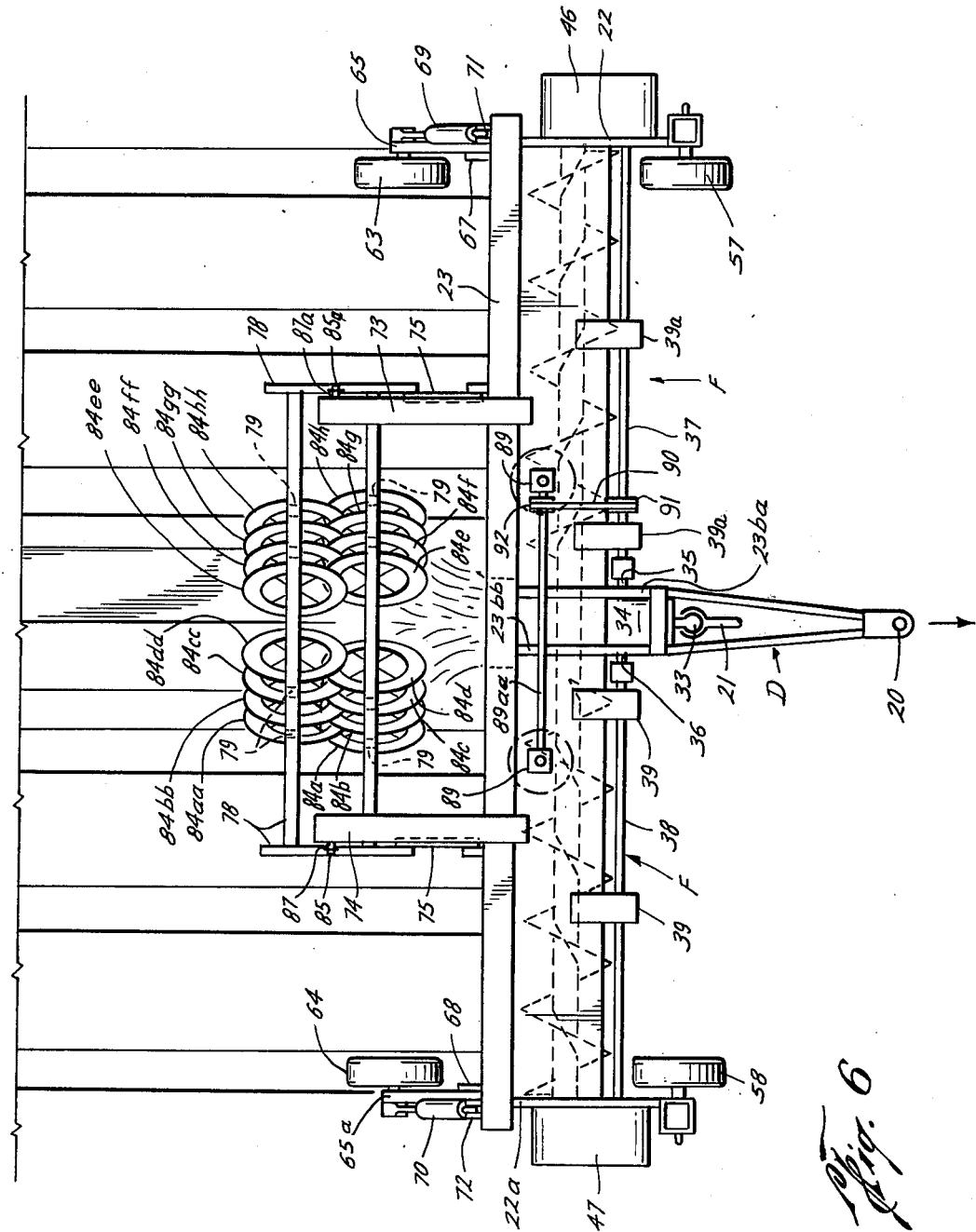
FIG. 6 is a plan view of the apparatus of this invention performing the method of this invention.

The apparatus A of this invention is shown in FIG. 1 in operation forming a levee on ground surface GS. The apparatus A includes a supporting frame F having a drawbar D which is aligned with the center line of the symmetrical apparatus A and which is designed for attachment of the apparatus A to a conventional agricultural tractor (not illustrated). The drawbar D includes a clevis member 20 which is connected by a draw pin to a tractor drawbar in the usual manner. A power take-off shaft (hereinafter PTO) 21 is connected to the tractor PTO in a conventional manner as is well-known in the art. As will be explained in detail hereinafter, the PTO drive of the tractor rotates the PTO shaft 21 to power the apparatus A for forming the levee or dike L as shown in FIG. 2.

The frame F of the apparatus A of this invention includes vertical side members 22 and 22a secured at opposite ends of the transverse box beam member 23, FIG. 1, which form a part of the overall frame structure. As best illustrated in FIG. 2, the beam 23 includes a square central opening O' and a forwardly extending horizontal support member 23a. A plurality of parallel arm members 23ba, 23bb and 23bc are secured with the beam 23 and plate 23a for attaching the drawbar D with the beam 23, but other suitable structure may be employed.

Mounted with the lower portion of side members 22 and 22a, respectively, are pillow bearing support blocks 24 and 25 which rotatably support transverse horizontal helical auger shaft 28 which includes helical auger flights 26 and 27 secured thereon. The helical auger flight 26 acts to move the earth inwardly toward the center of the apparatus and the helical flight 27 likewise moves the earth toward the center of the apparatus. The central portion of the shaft 28 includes no helical auger flights, (FIG. 1) for a reason as will be apparent hereinafter. The helical auger shaft 28 includes outer shafts 29 and 30 which are secured at opposite ends of the shaft 28 and which are rotatably mounted in the bearing support blocks 24 and 25, respectively to rotatably support the shaft 28. Sprockets 31 and 32 are secured with the shafts 29 and 30, respectively in the usual manner.

The power drive system for the apparatus of this invention includes a conventional universal joint 33 (FIG. 4) which connects the power take-off shaft 21 with a forwardly positioned input shaft 34a on the gear box 34 mounted with the top member 23a. The gear box 34 includes conventional reduction gears which converts the PTO input (generally 1,000 revolutions per minute) to a desired slower output. The gear box includes transverse output shafts 35 and 36 on opposite sides thereof. Mounted on the top of plate 23 are transversely extending drive shafts 37 and 38 which are rotatably mounted in intermediate bearing blocks 39 and 39a secured with the top of plate 23a and outside bearing supports 40 and 40a which are secured with the upper portions of the side members 22 and 22a at the outer ends of the shafts 37 and 38 at each side of the apparatus. Mechanical couplers 41 are provided for connecting the shafts 37 and 38 with the gear box output shafts 35 and 36, respectively for transmitting rotation to the shafts 37 and 38. Secured at the outer ends of the shafts 37 and 38 are chain drive sprockets 42 and 43, respectively, which are drivingly connected with the chain drive sprockets 31 and 32 by endless chains 44 and 45, respectively, for transmitting the rotation of the shafts 37 and 38 to the auger shaft 28, to rotate the helical auger means as more fully described hereinafter. Secured to the outer ends of the side members 22 and 22a are protective housing shields 46 and 47, respectively, which form an enclosure with the side members to shield the chains 44 and 45 from flying debris and dirt and also shield the equipment operators from injury.

As illustrated in FIG. 1, transversely extending backup plate means which includes spaced members 48 and 49 are secured to the beam member 23 directly behind the rotating augers to form a partial enclosure acting in conjunction with the augers 26 and 27 to convey earth to the center open portion 50 of the frame. The center open portion 50 is defined by the inner side portions 51 and 52 of the backup plate members 48 and 49, respectively. As best illustrated in FIGS. 4 and 6, the earth retaining members 48 and 49 are located closely adjacent the auger flights 26 and 27 to contain the earth in the auger flights to effect the desired movement toward the opening 50. Secured with the backup means and the central transverse beam 23 are a plurality of six laterally spaced digger or trencher plow means 53, including replaceable lower chisel or wear point portions 53a, 53b, 53c, 53d, 53e and 53f which are adapted to engage and lift the earth to form borrow ditches 54a, 54b, 54c, 54d, 54e and 54f, respectively, as best shown in FIG. 2. The lower edge members 55 and 56 of the backup plates 48 and 49, respectively, may also be made replaceable should they become worn and adjustable. Each of the plow chisels extend below the lower edges 55 and 56 of plates 48 and 49, respectively, a predetermined distance in order that the borrow ditches 54 will be formed without disturbing the ground surface with the bottom edges 55 and 56. Though the apparatus of this invention is preferably designed with the lower edge members 55 and 56 not in contact with the earth and disturbing the ground surface, it is to be understood that upon occasion there will be some sand contact such as when the depth of the plows is being adjusted or when high spots are encountered.

Secured to the side members 22 and 22a at their front edges are plow depth gauge setting means having gauge wheels 57 and 58 (FIG. 6) which in conjunction with support wheels 63 and 64 (described below) control the depth of the borrow ditches 54. The gauge wheel supports are mirror images so reference may be made to the description of the support for the gauge wheel 57 for a description of the gauge wheel 58. An adjustable post member 59 mounts the gauge wheel 57 through a conventional axle and bearing arrangement and has a plurality of height adjusting apertures 60 extending through the post member 59. Support bracket 61 is mounted, adjacent the front edge of the side members 22 to receive the post member 59. The support bracket 61 includes a single aperture (not illustrated) receiving a pin 62 which is likewise inserted through one of a series of spaced apertures (not illustrated) in the post member 59. As will be apparent, the relative position of the post member 59 and gauge wheel 57 to the side member 22 can be adjusted by selecting an appropriate aperture in the post member, aligning it with the aperture in the bracket member and inserting the pin 62. Other types of depth adjusting mechanisms may also be used to control the depth of the plow. Also, by positioning the gauge wheels in line with a ditcher plow, the ground surface between the ditches is not disturbed.

Mounted on the opposite sides of the rear of beam 23 and trailing in the bottom of the outer borrow ditches 54a and 54f, so as to least disturb the natural ground surface are support wheels 63 and 64. It is also understood that the tractor wheels may likewise be aligned with two ditches to avoid disturbing the ground surface by packing it which could adversely effect the germination of previously planted seed. As illustrated in FIG. 3, the support wheel 63 is rotatably mounted by conventional axles and bearings on rearwardly extending pivoted arm 65 which arm is pivotally connected as 67 to the rear of beam 23. Pivotally secured to the arm 65 is a conventional hydraulic cylinder 69 which is in turn pivotally connected through support pin 71 on the rear of beam 23. The wheel 64 is mounted in a similar manner with arm 65 and hydraulic cylinder 70. Hydraulic fluid is supplied to the hydraulic cylinders 69 and 70 from the tractor to effect their operation which, in turn pivots the arm 65 to position the support wheels 63 and 64 relative to the frame member 23 which in turn raises or lowers the plow chisels relative to the ground surface G. Use of such support wheels is well-known in the art as well as the means for supplying hydraulic fluid from the tractor to the support wheel hydraulic cylinders for raising and lowering of the support wheels 63 and 64 in conjunction with the wheels 57 and 58 control the relative depth of the plow blades 53a-f. The apparatus may also be attached directly to a lifting mechanism (three-point hitch) on a tractor which mounting arrangement would not necessarily require support wheels.

Secured with the frame transverse beam member 23 are rearwardly extending substantially horizontal beams 73 and 74 which connect with packer wheel means that are generally designated 77 in FIG. 3. As best illustrated in FIG. 4, laterally spaced parallel lower link 75 and upper links 76 are pivotally mounted to the beam 23 at laterally spaced locations with the rearmost ends of each set of links 75 and 76 also pivotally mounted to the horizontal frame 78 of the packer wheel means 77 which works the earth moved by the augers 26 and 27 and deposited through opening 50. The links 75 and 76 are disposed below the member 73 while corresponding links 75a and 76a are disposed below member 74. The parallel links enable the packer wheel means 77 to move upwardly and downwardly sufficiently to compensate for normal variation in the earth surface. The packer wheel means 77 includes the frame structure 78 having a plurality of vertical post members 79 mounting bearing supports (not illustrated) for rotatably supporting front wheel shaft 80 and rear wheel shaft 81 of the left-hand set of packer wheels (FIG. 6) and front shaft 82 and rear shaft 83 of the right-hand set of packer wheels. As illustrated in FIG. 6, the shafts 80 and 81 angle upwardly toward the center line of the apparatus and the shafts 82 and 83 likewise angle upwardly toward the center line of the apparatus for forming the levee. Rotatably mounted on the shafts 80, 81, 82 and 83 are a plurality of front packer wheels 84a-h and overlapping rear packer wheels 84aa-hh which act to pack the levee L. This overlapping and intermeshing of the packer wheels enables the amount of rearward extension of the packer wheels to be limited to make the packer wheel assembly more compact and inhibit clogging up of the packer wheels in extremely moist soil conditions. Secured to the frame 78 by clevis means 86 are chains 85 and 85a which limit packer wheel means 77 relative to the frame. Notches 87 and 87a formed in the beams 73 and 74 receive a link in the chains 85 and 85a, respectively, to provide means where the relative position of the packer wheel means 77 can be adjusted by merely changing the link of the chains 85 and 85a which is positioned in the notch members 87. Preferably, the chains 85 and 85a should have some slack so that the weight of the press or packer wheels will aid in packing the levee L. Additional levee working means may be connected behind the illustrated means for additional packing of the levee to provide a uniform levee resistant to erosion.

Mounted with the beam 23 is a planter means P which includes hoppers 88 and 88a which hold a supply of seed. The structure and operation of the hopper 88 will be described, but it is to be understood that the description is equally applicable to hopper 88a. The hopper 88 includes a dispenser mechanism 89 which controls the outflow of seed from the hoppers and which is driven by a chain 90 mounted on gear or sprocket 91 which is in turn secured to the drive shaft 37 and gear or sprocket 92 which is mounted on the dispenser mechanisms connecting drive shaft 89aa. Such dispenser mechanisms are well-known in the art and it is understood that they are of conventional type. Secured to the outlet of the dispenser mechanism 89 are hoses 93 which direct the seed from the dispenser to an inlet in the plate 23a above the augers in order that the seed will be deposited in the earth in the helical augers. Accordingly, the seed will be deposited in the dirt which is being moved inwardly by the helical augers so that the seed is planted on the levee L being formed.

Figure 7:
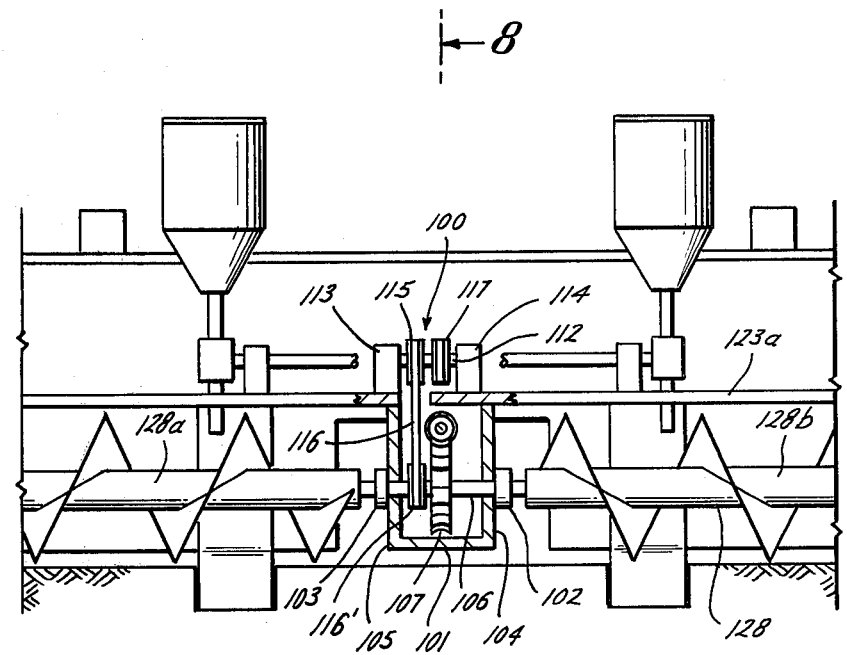
FIG. 7 is a view of an alternative power drive system.
Figure 8:
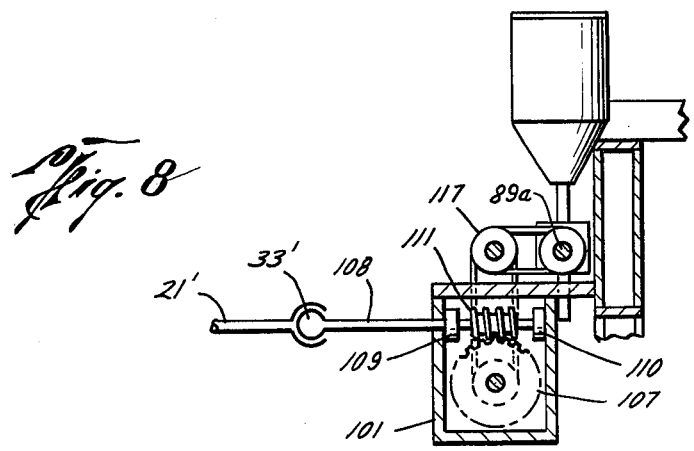
FIG. 8 is a side view taken along line 8—8 in FIG. 7.

An alternate embodiment of the power drive system 100 is illustrated in FIGS. 7 and 8. This embodiment includes a centrally mounted enclosed gear housing 101 secured with the lower surface of support member 123a that corresponds to the member 23a of the first embodiment. Bearing housing 102 and 103 are secured with side plates 104 and 105 of enclosed housing 101, respectively, and rotatably support the transverse drive shaft 106. The drive shaft 106 is secured in the center of the shaft 128 which is formed in two sections 128a and 128b. The large reduction or bull gear 107 is mounted on the shaft 106. Forwardly extending input shaft 108 is rotatably mounted in bearing blocks 109 and 110, which are respectively secured to the front and back of the gear housing, with worm gear 111 mounted on the shaft 108 and engaging the gear 107 in driving relationship. Universal joint 33' connects with a agricultural tractor power take-off shaft 21' with the drive shaft 108. The use of a worm gear drive provides a desirable input/output reduction ratio which, for instance, may be b 10:1. It is to be understood that the width and depth of the housing 101 is such as to not interfere with the movement of the removed earth by the augers 26 and 27 discussed hereinafter.

Secured to the shaft 106 is a planter drive sprocket 116'. Bearing blocks 113 and 114 are mounted on upper surface of member 123a and rotatably support a short transverse shaft 112 above the housing 101. Secured to the shaft 112 is a sprocket 115 which drivingly connects with sprocket 116a through chain 116 which extends through an opening in the member 123a. Sprocket 117 is also mounted on shaft 112 and is drivingly connected to planter means drive shaft 89a, by a chain (not illustrated) to drive planter dispenser mechanism 89 in the usual manner.

METHOD OF FORMING THE LEVEE

The method of forming the levee using the apparatus of this invention generally involves certain preliminary steps in preparation of the ground surface G prior to traversing the field with the levee forming apparatus. Such preliminary steps may include the tilling or other working of the ground surface and the planting of rice or other crop seed in the ground. It is preferable that the field may have been previously levelled for flood-type irrigation. After planting the field, the location where levees are to be formed is determined in a known manner and the apparatus of this invention is attached to a conventional agricultural tractor or other prime mover. The apparatus may then be pulled to the field and positioned for forming the levee. Although reference is made above to use with rice crops, it is understood that use of this invention would be applicable to other crops or whenever desired to build a water barrier levee or dike.

In the use and operation of the present invention, the gauge wheels 57 and 58 are first adjusted to the proper setting by positioning the pins 62 in the appropriate aperture in the gauge wheel post member. The tractor PTO may then be activated to drive the power take-off shaft 21 which in turn drives the helical auger as well as the planter means. The hydraulic cylinders 69 and 70 may then be activated to enable the apparatus to be towed to the location where the levee is to be built, lower the support wheels 63 and 64 and hold the plow above the ground.

Upon arrival at the field where the levee is to be built, the support wheels 63 and 64 are adjusted to place the plow blades at the desired trenching depth. As the apparatus is moved forward as indicated by the arrow in FIG. 6, the digger plows 53a-53f dig into the ground surface and remove narrow strips of earth to form the borrow ditches 54a-54f, respectively. The preferred width of the borrow ditches is eleven inches although it is possible to make the width of the borrow ditches more or less and still achieve the results of this invention. The space between the borrow ditches is preferably 14 inches and which distance also may be varied.

The total distance between the two borrow ditches adjacent the form levee L is preferably 6 feet although this distance may also be varied.

The preferred depth of the plow 53a-53f is such that the lower edge members 55 and 56 of the backup plate means do not disturb or engage the ground surface G in which seed has been planted. By not disturbing the surface, it is understood that the ground surface is preferably not contacted or not tilled to any extent that would involve effecting the germination of any planted seed in the undisturbed areas between the borrow ditches.

The plow 53a-53f remove the earth to form the borrow ditches and direct the earth upwardly into the rotating helical auger flights 26 and 27 where the earth is moved inwardly along the backup plates 48 and 49. As the earth moves inwardly, a controlled amount of seed is deposited from the hoppers 88 through the hoses 93 and mixed with the earth that is being carried inwardly by the rotating auger flights. The earth moves inwardly to the opening 50 between the backup plates where it is deposited to form the levee as best shown in FIGS. 4, 5 and 6. When the dirt reaches the center of the machine, it is forced up and out the back of the machine through the opening 50 by the forward motion of the tractor and the lift action of the inner flight of the auger.

As illustrated in FIG. 6, the packer wheel means 77 mounted on each side of the open portion 50 pack the loose dirt exiting therefrom to form the levee L. The levee formed by the apparatus and method of this invention provides a levee having a substantially uniform shape without any dips and weak spots and not result in any substantial yield loss in the area of the levee. Although the cross-section in FIG. 2 shows borrow ditches and the levee with relatively sharp corners, it is understood that in actual practice, the borrow ditches and levee would not be as sharply defined as a result of some loose earth dropping off the sides of the ditches depending on the soil conditions. Usually, the earth from the borrow ditches has a high moisture content which increases seed germination to provide an adequate stand on the levee because of adequate moisture.

As the power take-off drive provides a steady continuous feed and the cutting edges of the plow means are sharply angled so that with the cutting depth mechanically set with the gauge wheels and the natural weight of the machine, there is a positive cutting depth as the machine is pulled through the field. Accordingly, the same cubic feet of dirt is provided in every running foot of the levee from start to finish which help provide a levee of uniform shape and size. Also, since the borrow ditches are preferably of substantially the same size and depth the formation of low spots which may bog down equipment is reduced.

The levees may be removed by detaching the digger plows 53 and securing a central blade (not illustrated) to the apparatus along with reversing the direction of rotation of the augers 26 and 27. The blade would rip out the levee and distribute the removed earth to the auger which would move the earth automatically for depositing in the borrow ditches. The augers would serve both to distribute and level the earth from the levee.

Although tests have not been performed to verify Applicant's belief, it is believed that the levee formed as shown in FIG. 2, will not substantially reduce the yield in the area adjacent the levee. An object of this invention, among others, is to make the size of the borrow ditches 54 of such a predetermined size that the crop yield in the undisturbed area between the borrow ditches and the levee will not be effected. This is possible since the rice stand in these undisturbed areas should be hardier and produce more than if the area was planted solid after forming the levee. Furthermore, as far as known, when the levee is formed from a single large ditch on each side of the levee, the yield in the area of these ditches is generally poor due to some drowning out of the crop stand causing some loss in yield results.

The foregoing disclosure and description of the invention are illustrative and explanatory thereof, and various changes in the size, shape and materials as well as in the details of the illustrated construction may be made without departing from the spirit of the invention.

I claim:

1. A method of forming a levee in a field planted with seed, comprising the steps of:

forming a plurality of laterally spaced borrow ditches by removing earth from the ditches without disturbing the ground surface between the laterally spaced ditches;

transporting the removed earth to a predetermined location without disturbing the ground surface between the laterally spaced ditches;

depositing the earth which was removed from the plurality of ditches at the predetermined location;

working the deposited earth to form a levee having a substantially uniform shape without dips and weak spots;

planting the field with seed prior to forming the plurality of laterally spaced ditches and forming the ditches prior to germination of the seed to provide a stand of the crop on the undisturbed ground surface between the laterally spaced ditches;

planting additional seed in the deposited earth forming the levee to provide an adequate stand to maintain a good yield across the levee;

the step of planting additional seed includes adding the seed with the removed earth prior to depositing the earth to form the levee; and the step of forming the laterally spaced ditches including forming at least two ditches on each of the two sides of the predetermined location and forming the levee at the predetermined location without disturbing the ground surface at the space between each two ditches at each side of the levee.

2. The method as set forth in claim 1, wherein:
the step of forming the plurality of ditches comprising forming ditches having a depth and width of such a size so as to not substantially reduce the crop yield of the undisturbed ground surface in the area of the laterally spaced ditches and levee.

3. The method as set forth in claim 1, wherein:
the step of forming the plurality of ditches comprising forming ditches having a predetermined depth so as to provide removed earth forming the levee having adequate moisture to germinate seed planted on the levee.

4. The method as set forth in claim 1, wherein:
the step of working the levee includes packing the levee to retard erosion of the levee.

5. The method as set forth in claim 1, including the step of:

replacing the earth removed from the borrow ditches with the earth forming the levee to form a substantially level surface to provide drainage of the field.

6. An apparatus for traversing a rice field for forming a levee in the field comprising:
- a plurality of laterally spaced digger plow means for forming a plurality of laterally spaced borrow ditches by removing earth from the ditches without disturbing the ground surface between the ditches;
- means for transporting the removed earth to a predetermined location without disturbing the ground surface between the ditches and for depositing the removed earth at the predetermined location;
- said digger plow means including at least two laterally spaced digger plows positioned at each of the two sides of the predetermined location;
- said means for transporting and depositing being constructed and arranged to transport and deposit the removed earth at the predetermined location without disturbing the ground surface at the space between each two laterally spaced digger plows at each of the two sides of the predetermined location; and
- means for working the deposited earth to form a levee having a substantially uniform shape without dips and weak spots.

7. The apparatus as set forth in claim 6, wherein:
the transporting and depositing means having a helical auger means for laterally transporting the removed earth with a backup means spaced above the ground surface for confining the removed earth with the auger means without disturbing the ground surface until the earth is deposited from the auger at the predetermined location.

8. The apparatus as set forth in claim 7, wherein:
the backup means having an opening therein for depositing the removed earth at the predetermined location.

9. The apparatus as set forth in claim 8, wherein:
the backup means opening is centrally located; and the auger means having right and left-hand helical screws for transporting the removed earth to deposit it at the central opening.

10. The apparatus as set forth in claim 7, wherein:
the auger means having drive means for connecting to a prime mover for rotating the auger means.

11. The apparatus as set forth in claim 7, wherein:
the backup means having a laterally extending plate spaced rearwardly of and adjacent the auger means for confining the removed earth with the auger means and spaced above the ground surface when the digger plows are forming the ditches.

12. The apparatus as set forth in claim 6, wherein:
the working means including packer means with the apparatus for packing the levee to retard erosion.

13. The apparatus as set forth in claim 6, wherein:
the apparatus having a carrier frame or drawing behind a prime mover.

14. The apparatus as set forth in claim 13, wherein:
the carrier frame having depth wheel means and support wheel means for controlling the position of the digger means to set the depth of the borrow ditches.

15. The apparatus as set forth in claim 6, including:
planter means with the apparatus for planting the levee with seed.

16. The apparatus as set forth in claim 15, wherein:
the planter means having means for adding seed with the removed earth prior to depositing the earth at the predetermined location to provide a good stand on the levee.

17. The apparatus as set forth in claim 6, wherein:
each ditcher plow extends to such a depth to form the borrow ditches so as to not substantially reduce the rice yield of the ground surface in the area of the laterally spaced ditches and levee.

18. The apparatus as set forth in claim 6, wherein:
each ditcher plow extends to such a depth so as to provide removed earth forming the levee having adequate moisture under normal conditions to germinate seed planted in the levee.

* * * * *